United States Patent [19]

Mansukhani

[11] 4,290,072

[45] Sep. 15, 1981

[54] OPAQUE JET INK PRINTING METHOD AND COMPOSITION

[75] Inventor: Ishwar R. Mansukhani, Neenah, Wis.

[73] Assignee: American Can Company, Greenwich, Conn.

[21] Appl. No.: 115,916

[22] Filed: Jan. 28, 1980

[51] Int. Cl.³ .............................................. G01D 15/18
[52] U.S. Cl. ..................................... 346/1.1; 106/20; 346/75; 427/335
[58] Field of Search ..................... 346/1.1, 75, 140 R; 106/20, 22, 23; 427/335

[56] References Cited

U.S. PATENT DOCUMENTS

| | | | |
|---|---|---|---|
| 4,166,044 | 8/1979 | Germonprez | 106/22 X |
| 4,207,577 | 6/1980 | Mansukhani | 346/1.1 |
| 4,227,200 | 10/1980 | Mansukhani | 346/75 |

*Primary Examiner*—Joseph W. Hartary
*Attorney, Agent, or Firm*—Henry M. Bissell

[57] ABSTRACT

A method of jet ink printing to produce opaque images including jet ink printing a surface with a nonaqueous jet ink composition, and subsequently contacting the surface with a resin opacifying solvent before the ink composition has dried, to separate the solvent in the ink composition from the solids therein and render the image opaque. The surface which is to be printed on may be wetted with a resin opacifying solvent before printing or may be dry.

41 Claims, No Drawings

OPAQUE JET INK PRINTING METHOD AND COMPOSITION

BACKGROUND OF THE INVENTION

1. Field of the Invention

The present invention relates to a method of producing opaque printing utilizing a jet ink printer. More particularly the present invention relates to a method of rendering a nonaqueous jet ink opaque after it has been printed on a substrate which does not absorb the ink, usually glass or a clear plastic.

2. Description of the Prior Art

Numerous jet inks are known in the prior art, as are various methods of the application of jet ink to produce recorded information. Generally, two major problems arise in the production of inks of commercial value. The first is a problem of settling which arises when the jet printing ink is stored. Most commercially available jet ink printers have nozzle diameters of less than about 125 microns and thus, due to the settling of the pigments contained in the ink, tend to become clogged very easily when the printer is used after being shut down. This type of problem especially arises when pigmented ink is used, since pigments are not soluble in the ink compositions. Further, in order for a jet ink printer to operate satisfactorily, the viscosity of the ink preferably should be less than about 10 centipoise at room temperature. This low viscosity presents problems when the ink contains suspended pigments, as they do not stay suspended over long periods of time, and thus storage or shelf life is limited. In order to overcome these problems the printer can be modified by increasing the nozzle diameter, adding agitators, or other steps. However, generally, these modifications do not completely solve the problems. Thus, it would be appropriate to be able to provide a jet ink that does not necessarily contain a pigment or dye and yet is still visible upon completion of the printing process.

SUMMARY OF THE INVENTION

The present invention contemplates printing through jet ink methods on various surfaces which do not absorb the inks, and especially on beer and beverage containers. The container may be first sprayed or otherwise coated with a non-solvent for the ink, usually, an aqueous solution of, for example, soap. However, this step is optional, depending on the ink and the substrate being used. A colored or colorless jet ink is then printed on the surface of the material and, before the ink has dried, it is sprayed with water, or a soap solution, or another liquid which is miscible with the solvent in the ink, but which in is immiscible with the resin in the ink. Sufficient water, soap solution, or other resin opacifying solvent is utilized to result in the separation of the solids from the ink solution, and render the ink opaque.

The inks utilizable in the method of the present invention are generally those known in the art. When water-based inks are utilized, the resin opacifying solvent should not be water or soap. In the alternative, when an organic solvent-based ink is utilized, such as the alcohol or alcohol/ketone type inks, the water or soap solution opacifying solvent is desirable.

The inks of interest herein generally have viscosities within the range of those normally utilized for jet inks, and exhibit normal resistivities, so that they print by ordinary jet printing processes. The resins utilizable in the ink include epoxy/phenolic resin mixtures, rosins and modified rosins, polyamids, polyketones, polyesters, and modified cellulose resins. The ink would contain the normal general range of solvent content, i.e. it would have a solids content of from about 2% to about 60%, and the solvent would be selected in accordance the particular resin utilized. Generally, mixtures of lower alkyl alcohols containing from about 1 to about 6 carbon atoms, such as methanol, ethanol, n-propanol and isopropanol, and ketones such as dimethylketone, methylethylketone, and diethylketone are preferred. The particular solvent is not critical, so long as the resin utilized is sufficiently soluble in it to prepare an appropriate jet ink. The solvent, however, should be soluble in the eventual resin opacifying solvent, but the resin should not be readily soluble in the resin opacifying solvent. In fact it is preferred that the resin be insoluble in the resin opacifying solvent.

In order to facilitate the process of the present invention, electrolytes, such as alkaline earth and alkali metal halides, salts of carboxylic acids, such as formates, acetates, and other organic acids such as paratoluene sulfonic acid are included in the ink composition. The ink may, depending upon its particular use, include dye or coloring material, but the dye or coloring material, in accordance with the above parameters, should be soluble in the particular solvent utilized in order to avoid the prior art settling problems.

Lastly, in its preferred form, the present invention utilizes a slow evaporating solvent in combination with the ink solvents above. The slow evaporating solvents are those which do not exhibit as high a vapor pressure as the other solvents, and thus are used to keep the ink wet for a longer period of time in order to facilitate the process of the present invention. The slow evaporating solvents, in and of themselves, are new to the jet printing art. They include substituted and unsubstituted heterocyclic compounds having either five or six membered rings. The heterocyclic element can be either oxygen or nitrogen, and the ring can be saturated or unsaturated, and can have alkyl, carboxyl, amine, hydroxyl or other substituents thereon. Exemplary slow evaporating solvents include butyrolactone, pyrrole, and caprolactone. Additionally if desired, the ink may be colored, and thus translucent before it is rendered opaque. In the preferred form, if a dye is utilized to color the ink, the dye should be a basic dye. Exemplary dyes include Auramine Base NS, Rhodhamine Base FB, Victoria Blue Base FB, and Methyl Violet Base FB.

The slow evaporating solvent may also be a glycol such as ethylene glycol. When glycols are used in the inks they are used in the same percentages and amounts as the other slow evaporating heterocyclic solvents.

In addition, other known additives, such as anti-oxidants, anti-ozonants, and wetting agents may be added. These are well known in the prior art, and perform as described therein. Immediately after printing with the jet ink printer, the printed base is subjected to a resin opacifying solvent by, for example, spraying, or dipping in a solution. The concentration of components in this opacifying solvent depend upon the particular resin utilized, and the time lapse between printing and subjecting the printed article to the opacifying solvent. The solvent is normally water, but may be a soap solution or other ink solvent-miscible resin-immiscible material. In particular, modified rosin and polyketone jet printing inks are opacified best with water while, on the other hand, the epoxy-phenol resin ink compositions, including those where the epoxy-phenol resin is used in combination with a cellulosic resin, work best with a soap solution. The soap is a common soap, i.e. a saponified fatty acid, such as sodium or potassium stearate, but may be any commercially available wetting agent. The pH of the opacifying solvent is from 3 to 10, in order to provide the appropriate opacifying effects.

DESCRIPTION OF THE PREFERRED EMBODIMENTS

The process of the present invention, in its most general form, includes printing on a uniform substrate with a conventional jet ink printer, followed by contacting of the printed surface with an opacifying solvent and conventional drying of the opaque jet printed image. While the process of the present invention is particularly suited for transparent and translucent surfaces, such as glass and plastic bottles, it is also suitable for printing on most surfaces which do not absorb ink during jet printing. The invention is most particularly suited for jet printing on glass containers where the opacifying renders the image more visible. The remainder of the process of the present invention will be defined in terms of printing on a glass beverage container, although it is to be understood that it is equally applicable to other surfaces, such as signs, glass and plastic containers, and especially in any circumstance where good image visibility is needed or where adhesion of the printing presents a problem.

The process of the present invention is applicable to all jet ink processes, but in its preferred form the process utilizes jet ink printing with epoxy/phenol resins either alone or in combination with cellulosic resins, since it has been found that these resins print quite well, exhibit good adhesion to the preferred glass and plastic surfaces, and are surprisingly opacifiable by the process described herein. In this case, the preferred opacifying solvent is a soap solution. Additionally, when modified rosins, polyketones, or polyamids are utilized the opacifying solvent does not necessarily contain soap, and thus may be water.

In the preferred form of the process of the present invention, the substrate surface is contacted or wetted with the opacifying solvent, by for instance spraying, misting, or dipping in a bath, and, while the substrate surface is uniformly moist or damp, it is jet ink printed. The initial opacifying solvent contact step is effected to provide a uniform printing surface as well as to provide further opacifying capabilities to the present process. It may be eliminated if the surface that is to be printed is uniform in character, and if good wetting and adhesion of the jet ink can be obtained. However, prespraying is preferred since the opacity of the product is increased when the step is utilized. The jet ink printing is effected with standard ink compositions, including, if desired, a dye or other colorant. However, the dye is not a necessary component as the inks are rendered opaque by the process of the present invention, and thus are visible.

The inks, in their preferred form, constitute another portion of the present invention. It has been found that the process of the present invention, and, in fact, all jet ink printing processes, are significantly improved by the addition of a slow evaporating solvent to the ink. The slow evaporating solvent is a heterocyclic organic compound, defined hereinbelow, and improves the wetting and printing characteristics of the ink and, in addition, aids in maintaining the ink in a sufficiently wet condition to allow for the final application of the opacifying solvent which renders the printed ink opaque.

After printing by standard methods, and before the ink has dried, the printed item is subjected to the opacifying solvent a second time by, e.g., spraying, misting, immersion or vapor contacting. The time lag between printing and opacifying depends upon the ink composition, and the particular resin utilized. For instance, where a high solids ink is utilized, and the slow evaporating solvent is not present in the ink, then the opacifying solvent must be applied almost immediately after printing. However, if a lower solids ink composition and the slow evaporating solvent are used, then the time lag between printing and application of the opacifying solvent may be increased. Also, the temperature and the type of resin would affect the amount of time that the opacifying solvent must be maintained in contact with the printed article. Preferably, the opacifying solvent is applied by a mist or spray, especially when the time lag between printing and solvent contact is quite small. In the alternative, if the particular resin does not easily opacify, then it would be appropriate to dip the articles in a bath of the opacifying solvent, or spray them for a lengthy period of time, for instance, while they travel on a conveyor. These steps can be effected in ordinary bottle handling processes by the inclusion of art-recognized apparatus.

The inks utilizable in the process of the present invention have viscosities of from about 0.5 to 25 cps. at 25° C., preferably from about 1.35 to 4.0 cps at 25° C. However, slight variations in viscosity do occur due to evaporation and settling effects during processing, and especially after the solution is allowed to sit for a lengthy period of time, i.e. during overnight shutdowns. Thus, the viscosity ranges for the inks need to be adjusted during operation so that the jet printer properly forms the droplets necessary for jet printing. It should be further pointed out that since the rate of droplet formation, i.e. up to about 150,000 droplets per second, is determined by the orifice size and the piezoelectric crystal, and since the droplet size determines the signal input required to deflect the droplets, the viscosity of the solution is quite important. In addition, in view of the fact that jet printers utilize electrostatic field deflection of the droplets, the resistivity of the solution is important. For the process of the present invention the resistivity may be as high as 10,000 ohms-cm., but is preferably in the range from about 250 to 3,000 ohm-cm.

Numerous resins are utilizable in the process of the present invention, and, in general, the total resin content of the solution is from 2 to 60% by weight, and, preferably, from about 10 to about 25% by weight. The total resin concentration can be divided into two separate groups, as one of the optional features of the present invention is the use of a cellulosic resin. When present, the cellulosic resin would be utilized in amounts up to about 15% by weight, preferably from about 1 to 5% by weight, and the non-cellulosic resins would be present in a range of from 2 to 50% by weight, preferably from about 9 to about 20% by weight, all based on the total solution weight.

The resins utilizable in the ink compositions of the present invention are individual resins and mixtures of resins, utilizable in jet printing operations. These include the polyester resins, epoxy/phenolic resin mixtures, rosins and modified rosins, particularly pentaerythritol modified rosins, polyketones, and polyamids.

With regard to the cellulosic component, modified celluloses are utilized. The preferred modified celluloses include nitrocelluloses, alkylcelluloses, particularly ethylcellulose, and cellulose esters such as cellulose acetate and cellulose acetate butyrate. The particular resins chosen depends on the particular use desired. It has been found that all of the above resins can be opacified to at least some degree. However, the modified rosins, and the ketone based resins exhibit very good opacity when applied to addition polymer substrates such as polyethylene and thus are preferred for this use. The epoxy/phenolic resins on the other hand were found to operate suprisingly well on glass bottles, and it was further found that when the epoxy/phenolic resins were combined with a cellulose derivative, the resulting printing on wet glass bottles exhibited the best opacity and adhesion.

The solvents utilized for the resin are generally aliphatic alcohols, ketones, and hydrocarbons. These are known in the art and include, in the best mode, mixtures of a lower aliphatic alcohol, i.e. an alcohol having 1 to 6 carbon atoms such as methanol or ethanol, and a lower aliphatic ketone i.e. ketones with from 1 to 8 carbon atoms such as acetone or methyl ethyl ketone. In this form the lower aliphatic alcohol and the ketone are each present in a range from about 20% to about 80%. In the most preferred form the alcohol and ketone percentages each vary from 40% to 60% by weight, based on the solvent mixture. The solvent concentration in the solutions ranges from about 40% to 98% of the total ink composition, and preferably from about 50% to about 81% by weight of the total ink composition.

In order to provide good printing characteristics, electrolytes are normally added to the solution. The electrolytes include inorganic acids and short chain aliphatic carboxylic acids, i.e. acids containing from 1 to 3 carbon atoms and the salts of such acids, including, but not limited to, chlorides, sulfates, nitrates, formates, acetates, and other salts. The salts may be formed from alkali metals and alkaline earth elements, as well as ammonia. In addition, substituted sulfonic acids, such as para-toluene sulfonic acid etc. may be utilized as the electrolyte. It has been found that halide salts are most useful with the modified rosins, that para toluene sulfonic acid, and its derivatives are most useful with the modified rosins, particularly with pentaerythritol modified rosin. Lastly, it has been found that ammonium formate is the preferred electrolyte for use in epoxy/phenolic resin containing inks, especially those where the ink includes a cellulose derivative. The electrolytes are present in a range from about 0 to about 5% by weight, preferably about 0.1% to about 1.5% by weight.

Additionally, dyes or coloring materials may be provided in the ink compositions utilized in the present invention; however, such dyes and coloring materials are not necessary since the present process renders the ink opaque. When the dye is present, it is usually included in an amount up to about 10% of the total weight of the solution, preferably from about 0.1% to about 2.0% by weight. The dyes are basic dyes which are soluble in the particular solvent selected for the ink. By basic dyes, it is meant dyes which, in solution, have a pH of greater than 7.0. Exemplary dyes include Auramine Base NS, Rhodamine Base FB, Victoria Blue Base FB, and Methyl Violet Base FB.

Since many dyes act as electrolytes, the need for an electrolyte component depends on the dye selected. Also, since the resultant printed image is opaque, dyes are also optional. However, in order to obtain good printing characteristics, at least one of the two should be included. That is, either a dye, an electrolyte or both are to be present in the ink. The selection of these two components is usually controlled by the need for the ink to exhibit the above described physical characteristics.

In an additional form of the present invention, the inks contain from about 0 to 40% weight, preferably from about 7.5% to 30% by weight of a slow evaporating solvent. Slow evaporating solvents are those which exhibit a lower vapor pressure than the other solvents contained in the ink composition. These solvents are saturated and unsaturated heterocyclic compounds having five or six membered rings, which may be side chain substituted, and include lactones, amids, and amines being defined by the formulae:

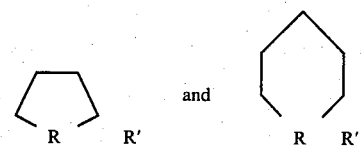

wherein R is a divalent oxygen or nitrogen radical, R' is hydrogen, divalent oxygen, hydroxyl, alkyl of from 1 to 5 carbon atoms, oxyalkyl of from 1 to 5 carbon atoms, monovalent ammonium, or a halogen radical. As noted, the ring may be either saturated or unsaturated, depending on the material chosen. Additionally, the rings may have up to 3 hetero atoms including oxygen, nitrogen and combinations thereof. The particular preferred slow evaporating solvents are butyrolactone, caprolactone, and pyrrole. Additionally, the heterocyclic ring may contain plural, i.e. up to 3, heteroatoms. The slow evaporating solvents in all cases, though, must be soluble in the ink and especially in the other solvents. Usually these solvents have a vapor pressure of under 10 mm Hg., preferably about 2 to 3 mm Hg., at standard temperature and pressure.

The opacifying solvent is usually water, or a water solution, preferably a soap solution. However, the opacifying solvent may be an aqueous solution of a commercially available wetting agent. The limitations found below are applicable to such agents in order to render the resultant images opaque. Soap, as used in the present application, is defined as a saponified or partially saponified fatty acids and glycerides and their salts, such as sodium stearate. The pH of the water is adjusted by normal means, if needed, such as by the addition of small amounts of hydrochloric acid or sodium hydroxide, so that it usually has a pH in the range of 3 to 10, preferably in the range of 6 to 8. Any pH adjustment that is needed is preferably done with a material compatible with the electrolyte utilized in the ink composition. Additionally, although water is the preferred opacifying solvent, organic and inorganic liquids that are miscible with the ink solvent and immiscible with the solids may be used. These opacifying solvents must be selected to have the effect of drawing the solvent from the ink and thus taking the resin in the ink out of solution before it dries. The result is that the resin in the ink is rendered opaque either from its dissolution or from the inclusion of small amounts of opacifying solvent in the ink as it dries. The opacifying solvent, in order to provide the needed coating action to opacify the ink, should, in addition, have a surface tension of about 72 dyne-cm, or less, preferably about 40 dyne-cm, or less.

A better understanding of the present invention may be had from a consideration of the following examples, however, the examples are not to be construed as limiting, as they are illustrative of the preferred forms of the present invention, and not a difinitive list of compositions. In all of the examples listed below, all of the formulations are on a total ink solution weight basis, unless otherwise indicated.

EXAMPLE 1

Nine inks were prepared in accordance with the formulas indicated in Table I. In each case, the ink was printed on a glass base, and thereafter subjected to a water spray before drying. In each case, the ink functioned quite well, and turned opaque upon the water treatment. The water had a pH of 7.5. Inks 1A to 1F were treated with a soap solution containing a 2% concentration of soap and having a surface tension of about 30.

methyl ethyl ketone as a solvent system. In this system, the heterocyclic lactone performed quite well and resulted in good opacity being obtainable by the process of the present invention. In addition, the inks adhered well to the glass substrates utilized in all of the cases.

EXAMPLE 2

A second series of tests was run using other resins, and substituting magnesium chloride as the electrolyte, as well as utilizing a dye. In each of these cases, good adhesion was obtained in the jet printing process, and the desired opacity was produced by the subsequent spraying of water onto the surface of the printed substrate, prior to the drying of the ink.

The compositions utilized are indicated in Table II herein.

TABLE II

|  | Ink A | Ink B | Ink C |
|---|---|---|---|
| Resin J* | 2.90 |  |  |
| Resin K* |  | 2.60 |  |
| Resin L* |  |  | 3.75 |
| Ethyl Cellulose | 1.20 | 1.10 | 1.40 |

TABLE I

INK FORMULATIONS

|  | Ink 1A | Ink 1B | Ink 1C | Ink 1D | Ink 1E | Ink 1F | Ink 1G | Ink 1H | Ink 1J |
|---|---|---|---|---|---|---|---|---|---|
| Resin A* | 3.20 |  |  |  |  |  |  |  |  |
| Resin B* |  | 4.00 |  |  |  |  |  |  |  |
| Resin C* | 9.60 | 12.00 |  |  |  |  |  |  | 2.70 |
| Resin D* |  |  |  |  |  |  |  |  |  |
| Resin E* |  |  | 15.00 |  |  |  |  |  |  |
| Resin F* |  |  |  |  |  | 2.50 |  |  |  |
| Resin G* |  |  |  | 9.60 |  |  |  |  |  |
| Resin H* |  |  |  |  | 9.90 |  |  |  |  |
| Nitrocellulose | 3.20 | 4.00 | 2.00 | 3.30 | 1.50 | 6.00 | 3.20 |  |  |
| Ethyl Cellulose |  |  |  |  |  | 1.50 | 1.30 |  |  |
| Cellulose Acetate Butyrate |  |  |  |  |  |  |  | 6.15 |  |
| Methanol | 27.00 | 22.10 | 39.00 | 31.10 | 32.60 | 78.50 | 95.37 | 81.85 | 52.25 |
| Isopropyl Alcohol |  |  |  |  |  | 5.50 |  |  |  |
| Methyl Ethyl Ketone | 27.00 | 42.00 | 19.00 | 31.00 | 32.40 | 5.00 |  | 11.60 | 21.25 |
| Acetone |  |  |  |  |  |  |  |  | 22.30 |
| Butyrolactone | 28.70 | 15.50 | 23.00 | 21.00 | 20.00 |  |  |  |  |
| Ammonium Formate | 0.30 | 0.40 |  | 0.40 | 0.30 | 1.00 |  |  |  |
| Para-Toluene Sulphonic Acid |  |  |  |  |  |  |  | 0.13 | 0.40 |
| Auramine Base NS |  |  | 2.00 |  |  |  |  |  |  |
| Rhodhamine Base FB | 1.00 |  |  |  |  |  |  |  |  |
|  | 100.00 | 100.00 | 100.00 | 100.00 | 100.00 | 100.00 | 100.00 | 100.00 | 100.00 |

*Resin A is D.E.R. 662, an epoxy resin produced by the Dow Chemical Company having an epoxide equivalent weight of 575 to 700, a softening point of 80 to 90° C. using Durran's Mercury Method, and a Gardner-Holdt viscosity of H-L in a 40% weight solution of a glycol ether. The color index is a maximum of 1 using the Gardner color standard of 1933.
*Resing B is EPON 1001, a Shell Chemicals epoxy resin exhibiting a Gardner-Holdt viscosity of D-G, a viscosity of from 1.0 to 1.7 (using ASTM test D-445), and exhibiting an epoxide equivalent of from 450 to 550, with a maximum Gardner color of 4.
*Resin C is AROFENE 6530 an Ashland Chemicals phenolic resin exhibiting a Gardner-Holdt viscosity at 25° of D-K (50% solution in denatured ethanol), a softening point of 180 to 210° F., using the Dennis Bar Method, a Gardner maximum color of 12 (using a 50% solution in denatured ethanol). The resin is a 100% phenol-formaldehyde thermoset.
*Resin D is ACRYLOID B-66 produced by Rohm and Haas comprising a polymerized mixture of acrylic acid, methacrylic acid and their ester.
*Resin E is PENTALYN 255, produced by Hercules, and is a rosin derived thermoplastic resin having an acid number of 180 to 200, a Gardner-Holdt viscosity at 25° C., of at least G, and a maximum Gardner color of 7, both in a 60% solids solution in ethanol.
*Resin F is KRUMBHAR 1717 HMP produced by the Krumbhar Resin Division of Lawter Chemicals Inc. It is a ketone based synthetic resin exhibiting a Gardner (1933) color of 2+ in a 60% isopropanol solution.
*RESIN G is EMEREZ 1511 produced by Emery Chemicals, and is a linear polyamide resin produced by condensation of fatty acids with polyalkyl polyamines. The resins have an amine value of 230 to 246 in hypochloride, a kinematic of viscosity of 31 to 38 poise at 75° C., a maximum Gardner color of 9.
*Resin H is VE 307 POLYESTER produced by Goodyear Rubber Company, exhibiting an extrinsic viscosity of 0.77, and an acid number of greater than 5.

The cellulose acetate butyrate utilized was supplied by Eastman Chemical Products Inc., and had an average weight percent butyryl content of 47, and an acetyl content of 2.0 and a hydroxyl content of 4.7. The hydroxyl equivalent weight was 362.

It should be noted that inks 1A through 1E utilized butyrolactone in combination with methanol and

| Methanol | 11.90 | 10.40 | 13.30 |
|---|---|---|---|
| Methyl Ethyl Ketone | 64.95 | 70.10 | 62.10 |
| Methyl Cellusolve | 18.50 | 15.25 | 19.30 |
| Magnesium Chloride | 0.15 | 0.15 | 0.20 |
| Auramine Base NS | 0.40 | 0.40 | 0.40 |

TABLE II-continued

|  | Ink A | Ink B | Ink C |
|---|---|---|---|
| Total Weight | 100.00 | 100.00 | 100.00 |

*Resin J is 100% phenolic resin produced by Ashland Chemicals under the name or Arofene 669 exhibiting a Gardner-Holdt viscosity of 1.5 to 2.5 when in a 60% solution in toluol and maximum Gardner color of 4.
*Resin K the Arofene 85678 an Ashland Chemicals 100% phenol formaldehyde thermosetting resin exhibiting a Gardner-Holdt viscosity at 25° C. of H-N, a softening point (using the Dennis Bar Method) of 77 to 93° C., and a maximum Gardner color (1963) of 12 (50% solution in denatured ethanol).
*Resin L is RCI 29419 of RCI Chemicals having a softening point (ball and ring) of 105 to 120° C. It is a thermosetting phenolic resin.

EXAMPLE 3

Other inks were prepared utilizing phenolic resins, individually and in mixtures, and utilizing butyrolactone as the slow evaporating solvent in some cases for comparison. Dyes were added to seven of the eight compositions. In each case the coatings on glass containers were produced by jet printing, and a soap solution containing 2% soap solution in water was utilized to opacify the printed inks. In this case, the glass bottles were wet prior to the application of the ink, and still adherence of the ink was quite good, and the opacity was very good. The particular ink compositions utilized are shown in Table III.

TABLE III

|  | Ink 3A | Ink 3B | Ink 3C | Ink 3D | Ink 3E | Ink 3F | Ink 3G | Ink 3H |
|---|---|---|---|---|---|---|---|---|
| Resin M* | 2.50 | 4.00 | 3.35 | 2.50 |  |  |  |  |
| Resin N* | 7.50 | 12.00 | 10.10 | 7.50 | 7.00 | 7.00 | 7.40 | 1.75 |
| Nitrocellulose |  | 1.25 |  | 2.80 |  |  |  |  |
| Ethyl Cellulose | 0.70 |  |  |  | 2.80 | 2.50 | 3.00 | 0.90 |
| Methanol | 28.60 | 31.50 | 44.80 | 28.00 | 27.00 | 27.00 | 29.60 | 66.35 |
| Methyl Ethyl Ketone | 25.00 | 25.00 | 28.00 | 28.00 | 27.00 | 27.00 | 29.60 | 13.80 |
| Acetone |  |  |  |  |  |  |  | 17.20 |
| Methyl Cellusolve |  |  | 12.35 |  | 27.00 | 27.00 | 29.60 |  |
| Butyl Cellusolve |  |  |  |  | 8.00 | 7.50 |  |  |
| Butyrolactone | 25.00 | 25.00 |  | 29.90 |  |  |  |  |
| Magnesium Chloride | 0.10 | 0.25 | 0.30 |  | 0.20 |  |  |  |
| Ammonium Formate |  |  |  | 0.30 |  | 1.00 |  |  |
| Auramine Base NS | 0.60 |  |  |  | 1.00 | 1.00 | 0.80 |  |
| Rhodhamine Base FB |  | 1.00 | 1.10 | 1.00 |  |  |  |  |
|  | 100.00 | 100.00 | 100.00 | 100.00 | 100.00 | 100.00 | 100.00 | 100.00 |

*Resin M is DER 661, produced by Dow Chemicals, and is an epoxy resin. It has an epoxide equivalent weight of 475 to 575, a softening point (Durran's Mercury Method) of 70 to 80° C., a Gardner-Holdt viscosity of G-J and a Gardner maximum color or 1.
*Resin N is arofene 24870 produced by Ashland Chemicals, and is a 100% phenol formaldehyde thermoset of the bisphenol type. It has a Dennis Bar softening point 175 to 205° F., and a Gardner-Holdt viscosity (60% solution in denatured ethanol) at 25° of K-U, and a Gardner (1963) maximum color of 11 (60% resin in ethanol).

EXAMPLE 4

In order to test the various heterocyclic slow evaporating solvents, several test were run utilizing different slow evaporating solvents. The ink compositions in all cases were epoxy/phenol resin mixtures, in combination with ethyl cellulose, the preferred form of the ink resin composition. The only variable utilized was that a different heterocyclic slow evaporating solvent was used in each case. In all cases, the ink printed quite well, and when subjected to a soap solution after printing, and before drying, the printing became opaque and quite visible. The compositions of the inks utilized for this test are shown in Table IV.

TABLE IV

|  | Ink 4A | Ink 4B | Ink 4C |
|---|---|---|---|
| Resin M | 3.50 | 3.50 | 3.50 |
| Resin O* | 10.50 | 10.50 | 10.50 |
| Ethyl Cellulose | 1.50 | 1.50 | 1.50 |
| Methanol | 34.70 | 34.70 | 34.70 |
| Methyl Ethyl Ketone | 34.50 | 34.50 | 34.50 |
| Butyrolactone | 15.00 |  |  |
| Caprolactone |  | 15.00 |  |
| M-Pyrol |  |  | 15.00 |
| Ammonium Formate | .30 | .30 | .30 |
|  | 100.00 | 100.00 | 100.00 |

*Resin O is Arofene 6530 produced by Ashland Chemicals, which is a 100% phenol-formaldehyde thermosetting resin. The resin exhibits a Dennis Bar softening point of 180 to 210° F., and a Gardner-Holdt viscosity of D-K at 25° C. (50% solution in denatured ethanol). The Gardner color (1963) is a maximum of 12 (in the same ethanol solution).

EXAMPLE 5

Several other ink compositions were prepared utilizing no cellulosic resin. In each of these cases, the same procedures were followed, and in each case, good printing and good opacity were obtained by the use of a soap solution as before. However, in this case the opacity was not quite as good as the epoxy/phenol mixture in combination with a cellulosic resin.

TABLE V

|  | Ink 5A | Ink 5B | Ink 5C |
|---|---|---|---|
| Resin M | 3.35 | 4.00 | 3.50 |
| Resin O |  |  | 10.50 |
| Resin N | 10.10 |  |  |
| Resin G |  | 8.00 |  |
| Methanol | 44.80 | 32.30 | 35.00 |
| Methyl Ethyl Ketone | 28.00 | 30.30 | 25.70 |
| Methyl Cellusolve | 12.35 | 25.00 |  |
| Butyrolactone |  |  | 25.00 |
| Magnesium Chloride | 0.30 |  |  |
| Ammonium Formate |  | 0.40 | 0.30 |
| Rhodhamine Base FB | 1.10 |  |  |
|  | 100.00 | 100.00 | 100.00 |

What is claimed is:
1. A process for opaque jet printing comprising:
providing a uniform printable substrate;
providing supply of jet ink comprising from 2% to 60% by weight of a resin or mixture thereof, from about 40% to about 90% of a solvent selected from the group consisting of aliphatic alcohols, ketones, hydrocarbons, and mixtures thereof, up to about 5% of an electrolyte, up to about 10% of a dye or other coloring material, and up to about 40% of a slow evaporating solvent selected from the group consisting of substituted and unsubstituted heterocyclic compounds having 5 or 6 membered rings and from 1 to 3 oxygen or nitrogen atoms in the ring, at least one of said dye and said electrolyte being present in said ink, said ink exhibiting a viscosity of from 0.5 to 25 cp. at 25° C. and having a resistivity of up to 10,000 ohm-cm.;

forming a jet of discrete droplets of said ink;

directing said jet toward said substrate;

modulating the density of said jet by applying an electric field thereto in accordance with information to be recorded;

printing said information on said substrate;

applying a coating of an opacifying solvent, before the solvents in the ink have evaporated, the solvents in the ink being miscible in the opacifying solvent, and the resin being immiscible in the opacifying solvent; and drying the thus opacified printed information.

2. The process of claim 1 wherein the opacifying solvent is applied to the substrate prior to printing in the form of a uniform thin layer.

3. The process of claim 2 wherein the opacifying solvent is applied to the printed substrate by spraying.

4. The process of claim 1 wherein the resin is a mixture of from 2% to 50% of a first resin, and from 0% to 15% of a second resin which is a modified cellulose selected from the group consisting of cellulose esters, alkyl celluloses, and cellulose nitrates.

5. The process of claim 4 wherein the resin concentration is from about 9 to about 20%, and the modified cellulose concentration is from about 1 to about 5% by weight.

6. The process of claim 5 wherein the first resin is an epoxy/phenol type resin.

7. The process of claim 1 wherein a solvent is present in an amount of from 50% to 81% by weight of the total ink.

8. The process of claim 7 wherein the solvent is a mixture of a lower aliphatic alcohol or a lower aliphatic ketone, each containing from 1 to 6 carbon atoms.

9. The process of claim 8 wherein each of the solvents is present in the solvent mix in an amount of from about 20% to 80% by weight.

10. The process of claim 9 wherein the solvent mixture contains from about 40% to about 60% by weight of each solvent.

11. The process of claim 1 wherein the electrolyte is selected from the group consisting of alkali metal, alkaline earth, and ammonium salts of inorganic acids and short chain aliphatic carboxylic acids.

12. The process of claim 11 wherein the electrolyte is present in an amount from about 0.1% to about 1.5% by weight.

13. The process of claim 12 wherein the electrolyte is a chloride, a nitrate or a sulfate salt.

14. The process of claim 1 wherein the dye is present in an amount of from 0.1% to about 2% by weight.

15. The process of claim 1 wherein the slow evaporating solvent is present in an amount from about 7.5% to about 30% by weight.

16. The process of claim 15 wherein the slow evaporating solvent is selected from the group consisting of lactones and cyclic inner amids and cyclic inner amines.

17. The process of claim 16 wherein the slow evaporating solvent is selected from the group consisting of butyrolactone, and caprolactone.

18. The process of claim 16 wherein the slow evaporating solvent has a vapor pressure of less than 10 mm. Hg. at standard temperature and pressure.

19. The process of claim 18 wherein the vapor pressure is from 2 to 3 mm. Hg.

20. The process of claim 1 wherein the viscosity of the ink is from 1.35 to 4 cp., and the resistivity is from about 250 to about 3,000 ohm-cm.

21. The process of claim 1 wherein the opacifying solvent is selected from the group consisting of water and aqueous soap solutions.

22. The process of claim 21 wherein the pH of the opacifying solvent is from 3 to 10.

23. The process of claim 22 wherein the solvent pH is from 6 to 8.

24. A jet ink composition comprising:

from 2% to 60% by weight of a resin or mixture thereof;

from about 40% to about 90% of a solvent selected from the group consisting of aliphatic alcohols, ketones, hydrocarbons, and mixtures thereof;

from about 0% to about 5% of an electrolyte;

up to about 10% of a dye or other coloring material; and up to about 40% of a slow evaporating solvent selected from the group consisting of substituted and unsubstituted heterocyclic compounds having 5 or 6 membered rings and from 1 to 3 oxygen or nitrogen atoms in the ring, said ink exhibiting a viscosity of from 0.5 to 25 cp. at 25° C. and having a resistivity of up to 10,000 ohm-cm.

25. The composition of claim 24 wherein the resin is a mixture of from 2% to 50% of a first resin, and from 0% to 15% of a second resin which is a modified cellulose selected from the group consisting of cellulose esters, alkyl celluloses, and cellulose nitrates.

26. The composition of claim 25 wherein the resin concentration is from about 9 to about 20%, and the modified cellulose concentration is from about 1 to about 5% by weight.

27. The composition of claim 26 wherein the first resin is an epoxy/phenol type resin.

28. The composition of claim 24 wherein a solvent is present in an amount of from 50% to 81% by weight of the total ink.

29. The composition of claim 28 wherein the solvent is a mixture of a lower aliphatic alcohol or a lower aliphatic ketone, each containing from 1 to 6 carbon atoms.

30. The composition of claim 29 wherein each of the solvents is present in the solvent mix in an amount of from about 20% to 80% by weight.

31. The composition of claim 30 wherein the solvent mixture contains from about 40% to about 60% by weight of each solvent.

32. The composition of claim 24 wherein the electrolyte is selected from the group consisting of alkali metal, alkaline earth, and ammonium salts of inorganic acids and short chain aliphatic carboxylic acids.

33. The composition of claim 32 wherein the electrolyte is present in an amount from about 0.1% to about 1.5% by weight.

34. The composition of claim 33 wherein the electrolyte is a chloride, a nitrate or a sulfate salt.

35. The composition of claim 24 wherein the dye is present in an amount of from 0.1% to about 2% by weight.

36. The composition of claim 24 wherein the slow evaporating solvent is present in an amount from about 7.5% to about 30% by weight.

37. The composition of claim 36 wherein the slow evaporating solvent is selected from the group consisting of lactones and cyclic inner amids and cyclic inner amines.

38. The composition of claim 37 wherein the slow evaporating solvent is selected from the group consisting of butyrolactone, and caprolactone.

39. The composition of claim 37 wherein the slow evaporating solvent has a vapor pressure of less than 10 mm. Hg. at standard temperature and pressure.

40. The composition of claim 39 wherein the vapor pressure is from 2 to 3 mm. Hg.

41. The composition claim 24 wherein the viscosity of the ink is from 1.35 to 4 cp., and the resistivity is from about 250 to about 3,000 ohm-cm.

* * * * *